(12) United States Patent
Emerson

(10) Patent No.: US 9,982,419 B1
(45) Date of Patent: May 29, 2018

(54) APPARATUS AND METHOD FOR HEATING FROZEN PIPES

(71) Applicant: David Vernon Emerson, Iowa Falls, IA (US)

(72) Inventor: David Vernon Emerson, Iowa Falls, IA (US)

( * ) Notice: Subject to any disclaimer, the term of this patent is extended or adjusted under 35 U.S.C. 154(b) by 0 days. days.

(21) Appl. No.: 15/272,102

(22) Filed: Sep. 21, 2016

(51) Int. Cl.
| | |
|---|---|
| *E03B 7/10* | (2006.01) |
| *E03B 7/14* | (2006.01) |
| *F16L 53/00* | (2018.01) |
| *E03B 7/12* | (2006.01) |

(52) U.S. Cl.
CPC .............. *E03B 7/14* (2013.01); *F16L 53/004* (2013.01); *F16L 53/34* (2018.01); *E03B 7/12* (2013.01)

(58) Field of Classification Search
CPC ...................................................... F16L 53/008
USPC .............. 138/33, 35; 219/523; 392/478, 498
See application file for complete search history.

(56) References Cited

U.S. PATENT DOCUMENTS

| | | | |
|---|---|---|---|
| 458,503 A | 8/1891 | Simpson | |
| 494,484 A | 3/1893 | McRae | |
| 558,992 A | 4/1896 | Silver | |
| 1,015,923 A | 1/1912 | Abtmeyer | |
| 1,171,962 A | 2/1916 | Kinan | |
| 1,289,686 A | 12/1918 | Davey | |
| 1,361,023 A | 12/1920 | Darley | |
| 2,382,512 A | 8/1945 | Simon | |
| 2,426,976 A | 9/1947 | Taulman | |
| 2,516,950 A | 8/1950 | Bragg | |
| 3,275,803 A | 9/1966 | True | |
| 3,351,738 A | 11/1967 | Kahn | |
| 3,364,337 A | 1/1968 | Kahn | |
| 3,377,463 A | 4/1968 | Rolfes | |
| 3,932,727 A * | 1/1976 | True ...................... | F16L 53/008 137/297 |
| 4,110,597 A * | 8/1978 | Elmore .................. | E04D 13/103 138/33 |
| 4,124,039 A | 11/1978 | St. Laurent | |
| 4,214,147 A * | 7/1980 | Kraver .................. | F16L 53/008 137/341 |
| 4,334,142 A | 6/1982 | Blackmore | |
| 4,423,311 A * | 12/1983 | Varney, Sr. ............... | E03B 7/14 138/33 |
| 5,182,792 A | 1/1993 | Goncalves | |
| 5,859,953 A | 1/1999 | Nickless | |
| 6,300,607 B1 * | 10/2001 | Steinhauser ......... | H05B 1/0291 219/523 |
| 8,983,282 B2 * | 3/2015 | Bishara ................... | F24H 3/002 131/173 |

(Continued)

*Primary Examiner* — Patrick F Brinson
(74) *Attorney, Agent, or Firm* — McKee, Voorhees & Sease, PLC

(57) ABSTRACT

An apparatus for use in thawing frozen material in pipes, the apparatus including conduit through which a plurality of wires pass, the conduit having a first end and a second end, the first end including an attachment selected from a heating element, a camera, or a light and wherein the attachment is secured to the conduit through a plug. The heating element includes a plastic outer shell and is controlled by a thermostat which may use a sensor, such as a thermocouple. The heating element, light or camera may be powered by any known source, including a 110 Volt outlet, 220 Volt outlet or by battery.

20 Claims, 6 Drawing Sheets

(56) References Cited

U.S. PATENT DOCUMENTS

2009/0107558 A1* 4/2009 Quigley ............... F16L 11/12
                                                137/15.01

* cited by examiner

APPARATUS AND METHOD FOR HEATING FROZEN PIPES

BACKGROUND OF THE INVENTION

Field of Invention

The present invention relates to an apparatus and method for heating or thawing frozen pipes and, in particular, to an apparatus, method, and system adapted to easily melt the frozen material from within the pipes quickly and efficiently.

Related Art

Pipes carrying water which are not properly insulated, not located below the frost line, or otherwise are not located in an above-freezing environment may freeze. This most frequently occurs in water pipes running to and from a structure in which the water pipes are no longer located beneath the frost line. Such pipes are typically full of standing water, which, if subjected to freezing conditions can cause problems. Frequently, the problems are noticed in a significant drop in water pressure or, if the pipes are completely blocked by ice, the problem is noticed in the absence of water coming from the tap. In certain circumstances, ice in pipes can expand to the point of causing significant damage, including rupture, to the pipes.

To address the situation where ice is present in one or more pipes, typically hot water is injected until the ice melts. While this method may do the job where the ice in the pipe is close to a point of access, such as a drain or faucet, this method presents problems when the ice in the pipes is not located close to the point of access. Using hot water is also problematic from a practical standpoint as it requires a large volume of hot water, a water heating device and a way to drain both the used hot water and any pre-existing still water in the pipes as the thawing operation proceeds. This means it is typically messy, cumbersome and not always effective.

Others have tried to address thawing of pipes in a variety of ways. For example, U.S. Pat. No. 458,503 to Simpson required a complex arrangement to heat water and inject the heated water into the frozen pipe. The Simpson apparatus is not easily transportable, compact or particularly efficient as it requires burning oil to heat water through a heat exchanger. Simpson also requires a separate receptacle to collect the used hot water and melted ice. Others have tried to simplify the water based systems, such as Simpsons. For example, U.S. Pat. No. 4,124,039 to St. Laurent shows a more compact arrangement, but still relies on a pump, reservoir, heater and the injection of hot water to thaw the frozen pipe.

Others have tried to replace the water based system, such as those shown in Simpson and St. Laurent, with non-water based arrangements. For example, U.S. Pat. No. 3,275,803 to True discloses a water pipe heating apparatus that uses electric heat tape connected to a thermostat and an electric source to heat the exterior of a pipe to melt the ice within. Similarly, U.S. Pat. No. 3,364,337 to Kahn teaches heating pipes through externally applied heating strips each including a thin resistance element. Others have tried using a gas to melt the ice. For example, U.S. Pat. No. 558,992 to Silver uses steam that is passed through a tube to a hollow ball that it heats to melt the ice. Of course, the steam must be generated on-site making the Silver apparatus cumbersome to use.

All of these prior attempts fail to suggest a simple to use, economical and portable apparatus to thaw ice in pipes. Room for improvement therefore exists in this technical field.

SUMMARY OF THE INVENTION

It is therefore a principle object, feature, aspect, and/or advantage of the present invention to provide an apparatus, method, or system which improves over or solves problems and deficiencies in the state of the art.

Additional objects, features, advantages, or aspects of the invention relate to an apparatus, method, or system which:
1. is easily used;
2. is economical to operate;
3. is portable;
4. does not rely on supplying preheated fluids or gases;
5. can be used at relatively great distances from an opening.

In one aspect of the invention, a pipe thawing apparatus is provided that includes an electric heating element is provided at the end of a cable or flexible conduit which is easy to use, economical to operate, easily portable, and wherein the conduit may be of any desired length, diameter and material. Preferably, the pipe thawing apparatus of the present invention also allows the user to use the conduit for other functions. For example, by having the electric heating element portion be removable, it may be replaced with other electrical elements, such as cameras, lights, etc.

These and other objects, features, aspects or advantages of the present invention will become more apparent with reference to the accompanying specification and claims.

DETAILED DESCRIPTION OF EXEMPLARY EMBODIMENTS OF THE INVENTION

Overview

Figure 1:
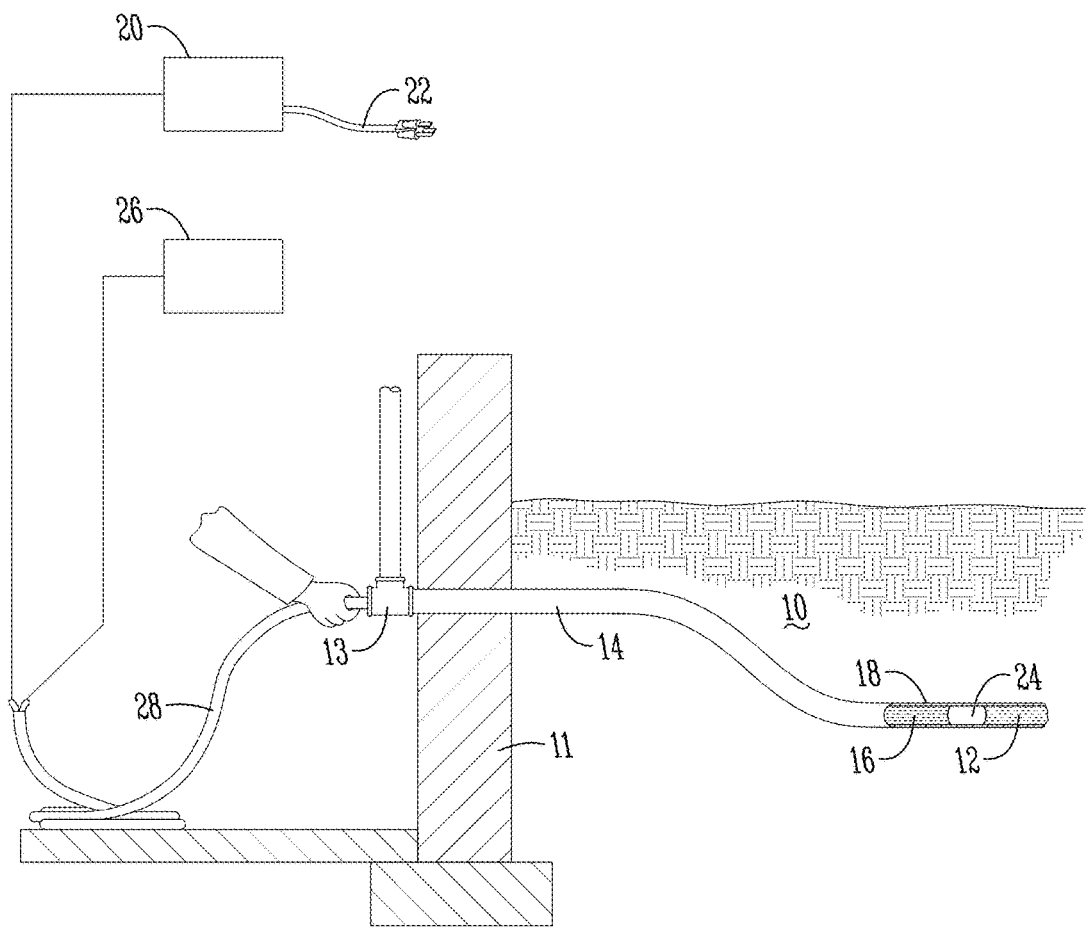
FIG. 1 is a side view of the preferred pipe thawing apparatus in use.
Figure 2A:
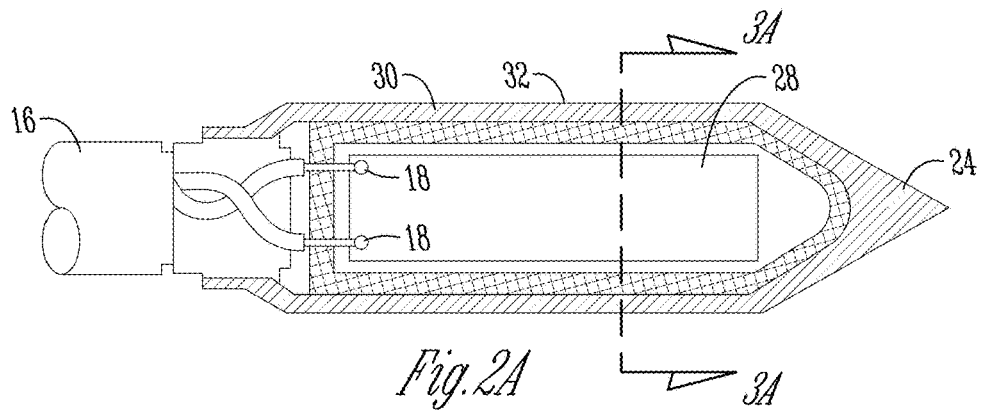
FIG. 2A is a side sectional view of the preferred heating element and its preferred connection to the conduit.
Figure 2B:
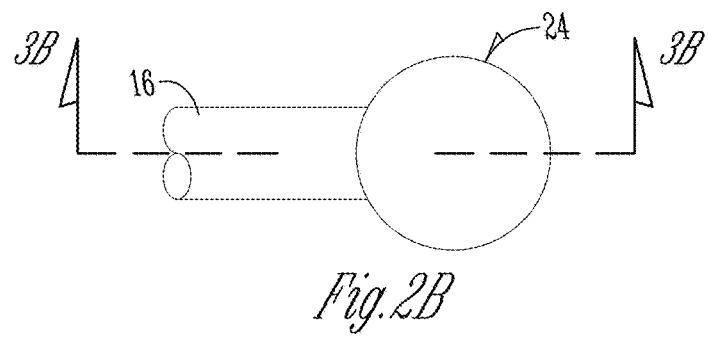
FIG. 2B is an alternative embodiment of the heating element of 2A.
Figure 2C:
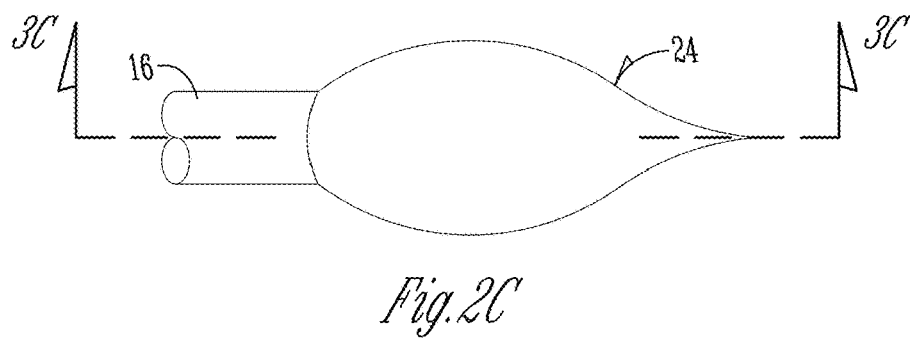
FIG. 2C is an alternative embodiment of the heating element of 2A.
Figure 2D:
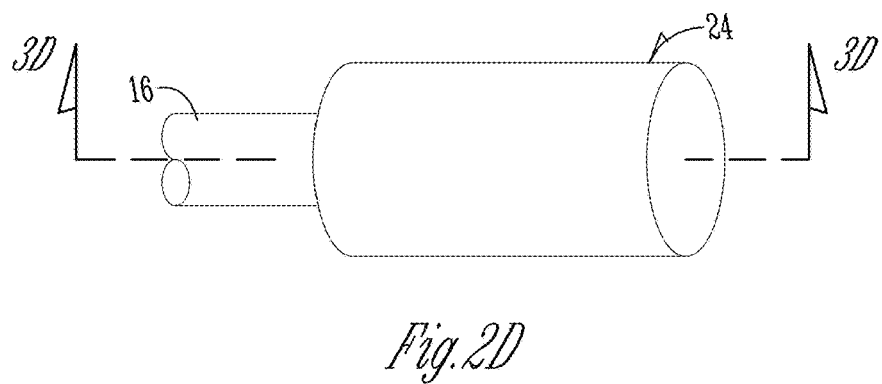
FIG. 2D is an alternative embodiment of the heating element of 2A.
Figure 3A:
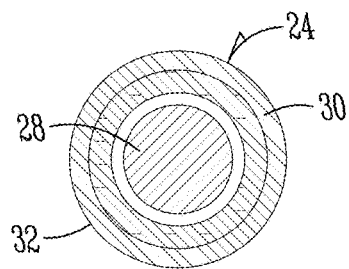
FIG. 3A is a top sectional view of the heating element of 2A.
Figure 3B:
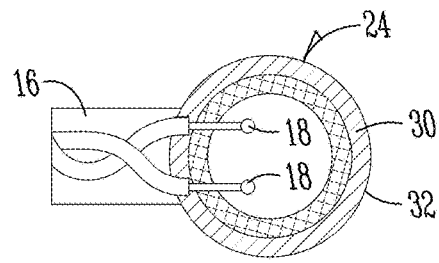
FIG. 3B is a side sectional view of the heating element of 2B.
Figure 3C:
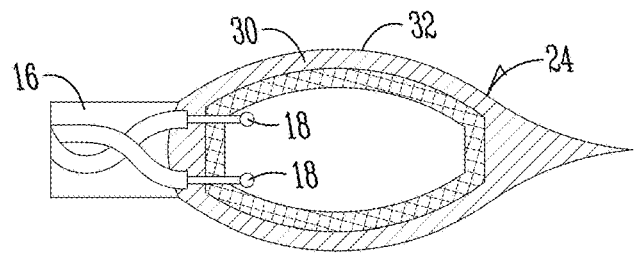
FIG. 3C is a side sectional view of the heating element of 2C.
Figure 3D:
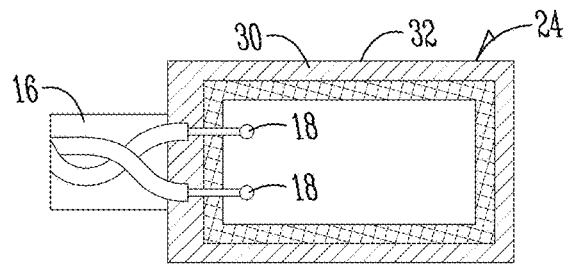
FIG. 3D is a side sectional view of the heating element of 2D.
Figure 4:
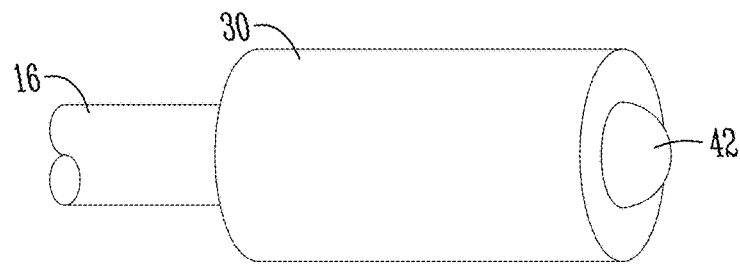
FIG. 4 is a perspective view of an alternative embodiment of the heating element including a light bulb.
Figure 5:
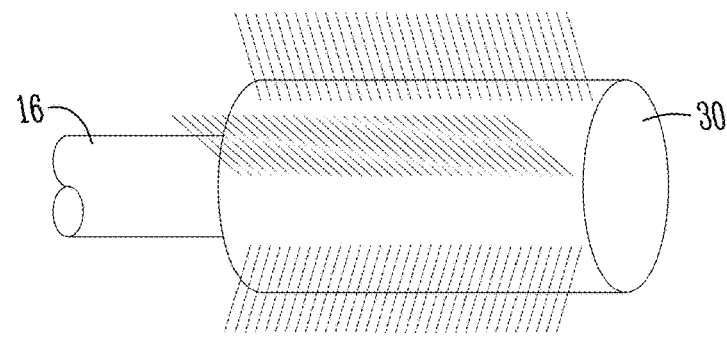
FIG. 5 is a perspective view of an alternative embodiment of the heating element.
Figure 6:
FIG. 6 is a perspective view of an alternative embodiment of the heating element including a hardened end.
Figure 7:
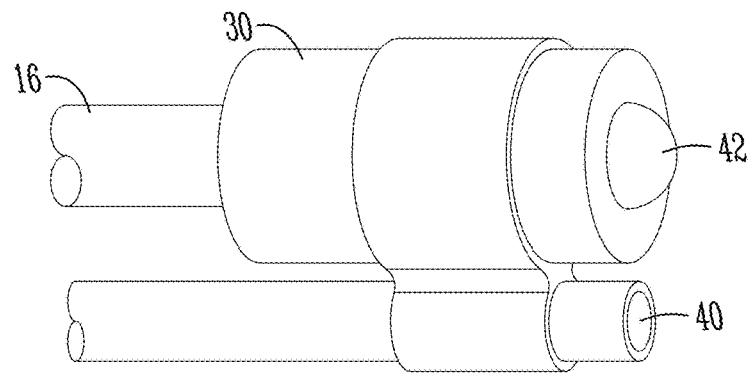
FIG. 7 is a perspective view of an alternative embodiment of the heating element including a light bulb and a camera.
Figure 8:
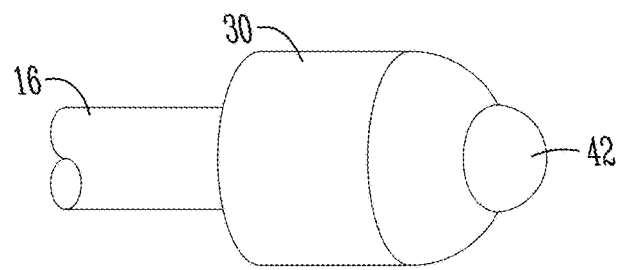
FIG. 8 is a perspective view of an alternative embodiment of the heating element including a hardened end.
Figure 9:
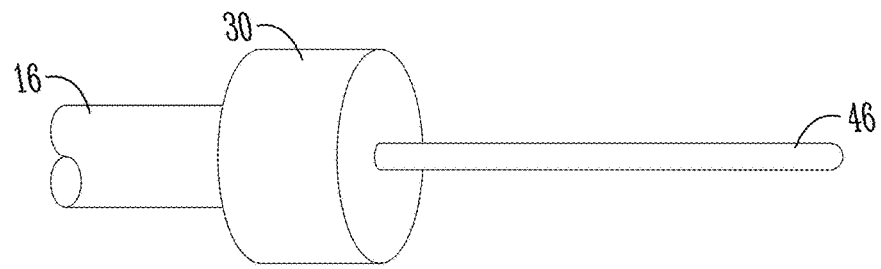
FIG. 9 is a perspective view of an alternative embodiment of the heating element including a microphone.
Figure 10:
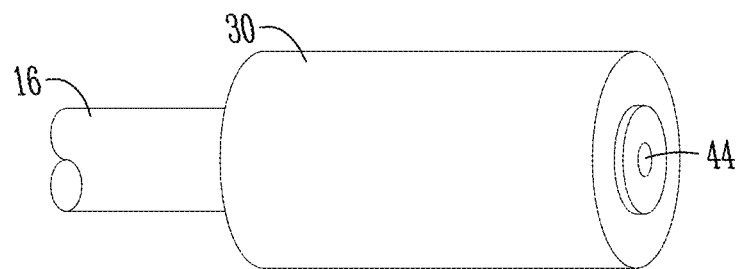
FIG. 10 is a perspective view of an alternative embodiment of the heating element including a camera.
Figure 11:
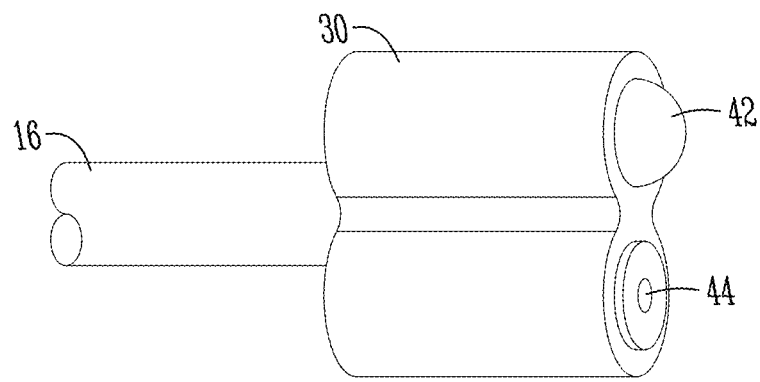
FIG. 11 is a perspective view of an alternative embodiment of the heating element including a light bulb and a camera.

For a better understanding of the invention, specific examples of forms and embodiments the invention can take will now be set forth in detail. Frequent reference will be made to the appended drawings. Reference numbers will be used to indicate certain parts and locations in the drawings. The same reference numerals will be used to indicate the same parts and locations throughout the drawings unless otherwise indicated.

This exemplary embodiment will be described in the context of a home with a pipe including frozen material where the pipe is located in the ground outside of the home. It is to be understood, however, that the location of the frozen material in the pipe and of the pipe itself is of no consequence to the present invention. In general, the invention may be used to thaw frozen material from any pipe in any location, so long as it is fluidly connected to an opening. Therefore, the present invention is not to be limited by the pipe location, the location of the frozen material, or the type of frozen material.

FIG. 1 shows the present invention 10 being used to thaw frozen material 12 from a pipe 14. In one embodiment, the present invention 10 includes a conduit 16 through which a plurality of wires 18 pass. The wires 18 connect to a power source 20 which may be accessed using a standard 110 Volt outlet plug-in 22 on one end of the wires 18. The present invention 10 may also be powered by a 220 Volt outlet source or by battery power. Operatively connected to the other end of the wires is a heating element 24. The heating element 24 may be made of a material that turns electrical current into heat through resistive heating. For example, nichrome, which is a combination of nickel and chromium, may be used. Other heating elements, such as infrared lights, heating wire or any other electrically powered heating element may be used.

The heating element is controlled by a thermostat 26 or other control system. The thermostat 26 works in conjunction with one or more sensors 28, such as a thermocouple, to ensure the heating element 24 is maintained at or about a preferred temperature, the preferred temperature being at least above the melting point for the frozen material 12. The thermostat 26 can also be used to turn the heating element 24 on and off.

As the heating element 24 is intended to conduct heat near ice or other frozen material 12, it is preferred that the heating element 24 be water proof or at least water resistant. As shown in FIG. 2, the heating element 24 is preferably encased in a shell 30 of plastic, metal or any other material that allows sufficient heat transfer and water resistance. The shell 30 may be a plastic material that is molded around the heating element 24. Because the heating element 24 and shell 30 are frequently subjected to contact with the pipe 14 or frozen material 12, it is likely the heating element 24 will need to be replaced periodically. Rather than requiring the purchase of an entirely new apparatus 10, the user of the present invention 10 preferably can simply replace the heating element 24 and shell 30, which may be multiple pieces or formed together as a single, removable piece 32.

The removable piece 32 is secured to the conduit 16 by a plug 34. The plug 34 includes a securing member 36 or profile that fits into a receiving end 38 of the conduit 16. For example, the securing member 36 of the plug 34 may be threads that screw into a threaded end of the conduit 16. If desired, the plug 34 may be more permanently affixed to the conduit 16 through shrink wrapping the area where the plug 34 and conduit 16 meet.

The plug 34 also includes electrical connections 40 that operatively connect the heating element 24 to the wires 18 and ultimately to the power source 20. The electrical connections can be similar to those found in a light bulb, ensuring the present invention 10 may also be used as a lighting source. For example, in such a situation, the heating element 24 may be replaced with a light bulb 42 in the present invention 10. Other attachments, such as a camera 44, microphone 46 or hardened end 48 may be used as desired.

Options and Alternatives

It will be appreciated that the invention can take many forms and embodiments. Just a few examples have been set forth above. Variations obvious to those skilled in the art will be included within the invention which is defined solely by the appended claims.

What is claimed is:

1. An apparatus for heating frozen material within a pipe, the apparatus comprising:
   a. a conduit through which a plurality of wires pass;
   b. a source of electricity operatively connected to the wires;
   c. a monolithic, removable, and replaceable piece comprising:
      i. a heating element directly covering the conduit, operatively connected to the wires, and powered by electricity; and
      ii. a plastic, water resistant outer shell molded around the heating element and
   d. a thermostat operatively connected to the heating element to control the amount of electricity supplied to the heating element from the source.

2. The apparatus of claim 1 wherein the source of electricity is a 110 Volt outlet.

3. The apparatus of claim 1 wherein the source of electricity is a 220 Volt outlet.

4. The apparatus of claim 1 wherein the source of electricity is a battery.

5. The apparatus of claim 1 further comprising a sensor operatively connected to the thermostat.

6. The apparatus of claim 5 wherein the sensor is a thermocouple.

7. An apparatus for use in pipes, the apparatus comprising:
   a. a conduit through which a plurality of wires pass, the conduit having a first end and a second end, the first end including a heating element and a plurality of attachments selected from the following:
      i. a camera;
      ii. a light
      iii. a microphone; and
      iv. a hardened end;
   b. wherein the heating element and the plurality of attachments are secured to the conduit through plugs having electrical connections to connect the heating element and the plurality of attachments to the wires.

8. The apparatus of claim 7 further comprising a source of electricity operatively connected to the wires.

9. The apparatus of claim 8 wherein the source of electricity is a 110 Volt outlet.

10. The apparatus of claim 8 wherein the source of electricity is a 220 Volt outlet.

11. The apparatus of claim 8 wherein the source of electricity is a battery.

12. The apparatus of claim 7 further comprising an outer shell secured around the heating element.

13. The apparatus of claim 12 wherein the outer shell is a plastic material molded around the heating element.

14. The apparatus of claim 7 further comprising a thermostat and a sensor operatively connected to the thermostat.

15. The apparatus of claim 14 wherein the sensor is a thermocouple.

16. The apparatus of claim 1 wherein the heating element is spherical.

17. The apparatus of claim 1 wherein the heating element is teardrop shaped.

18. The apparatus of claim 1 wherein the heating element is cylindrical.

19. The apparatus of claim 1 wherein the frozen pipe is located in the ground outside of a residential home.

20. The apparatus of claim 1 wherein the heating element is comprised of nichrome.

\* \* \* \* \*